J. P. LEONARD & G. HANCOCK.
Sediment-Collectors and Blow-Offs for Steam-Boilers
No. 134,811.  Patented Jan. 14, 1873.
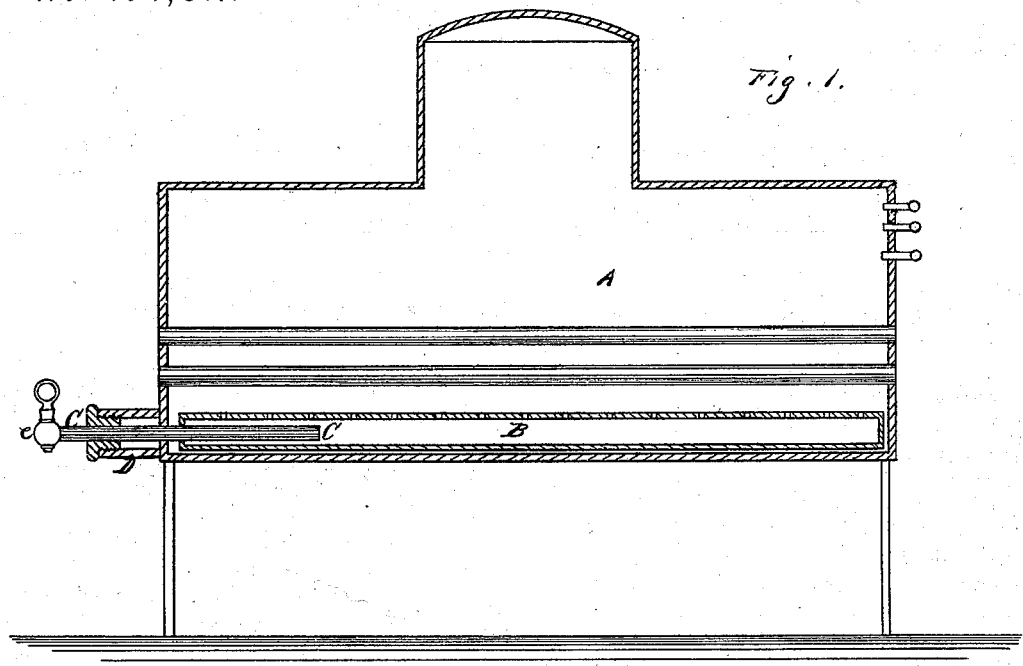
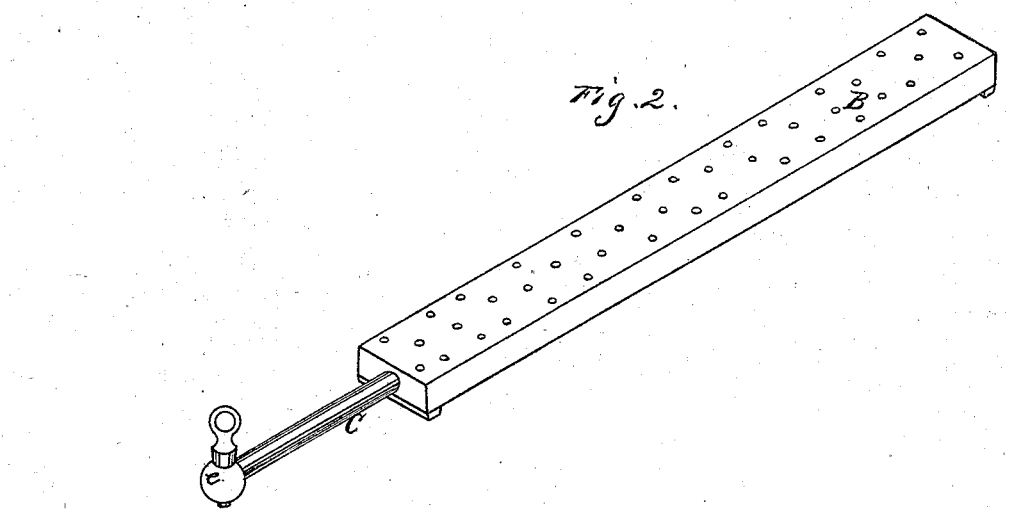
Witnesses  John P. Leonard
George Hancock
per Dewey & Co
Att'ys

UNITED STATES PATENT OFFICE.

JOHN P. LEONARD AND GEORGE HANCOCK, OF OROVILLE, CALIFORNIA.

IMPROVEMENT IN SEDIMENT-COLLECTORS AND BLOW-OFFS FOR STEAM-BOILERS.

Specification forming part of Letters Patent No. 134,811, dated January 14, 1873.

*To all whom it may concern:*

Be it known that we, JOHN P. LEONARD and GEORGE HANCOCK, of Oroville, Butte county, State of California, have invented an Improved Sediment-Collector and Blow-Off for Steam-Boilers; and we do hereby declare the following description and accompanying drawing are sufficient to enable any person skilled in the art or science to which it most nearly appertains to make and use our said invention or improvement without further invention or experiment.

The object of our invention is to provide a combined sediment-collector and blow-off for steam-boilers by which the sediment can in an instant, when desired, be removed by the pressure inside of the boiler.

In order to explain our invention so that others will be able to understand the same, reference is had to the accompanying drawing forming a part of this specification, in which—

Figure 1 is a longitudinal section of a boiler containing our invention; and Fig. 2 is a perspective view of the collector.

A represents a steam-boiler of whatever description. In the bottom of this boiler, below the water-line, we place a tube, B, which is provided with numerous perforations upon its upper surface. This tube may be of any desired shape, either round, square, oval, or flat, and of any desired length, although we prefer to make it the full length of the boiler. A pipe or tube, C, passes through a stuffing-box, D, in the outer end of the boiler, and has at its extremity, which is outside of the boiler, a blow-off cock, e, while its opposite end, which is inside of the boiler, passes through the end of the perforated tube C and into it. This pipe should be long enough to reach the whole length, or nearly the whole length, of the tube B.

The perforated tube B will collect all of the impurities or foreign substances from the water in the boiler, and is better than an open vessel or pan, as its contents are not affected by the currents in the boiler. The sliding pipe C serves as a means of carrying off the collected impurities when the cock e is opened, and for this purpose it can be moved along the perforated tube, so as to stir up the sediment and thus insure its passing off. The pressure inside of the boiler serves to drive the sediment out through the pipe. By this means we are able to collect and draw off the accumulated impurities without opening the boilers, and with very little trouble.

Having thus described our invention, what we claim, and desire to secure by Letters Patent, is—

The perforated tube B, in combination with the sliding pipe or tube C and blow-off cock e, constructed and arranged substantially as and for the purpose above described.

In witness whereof we hereunto set our hands and seals.

JNO. P. LEONARD.  [L. S.]
     his
  GEORGE + HANCOCK. [L. S.]
     mark.

Witnesses:
 JOHN DICK,
 W. H. CHAPPELL.